Figure 1:
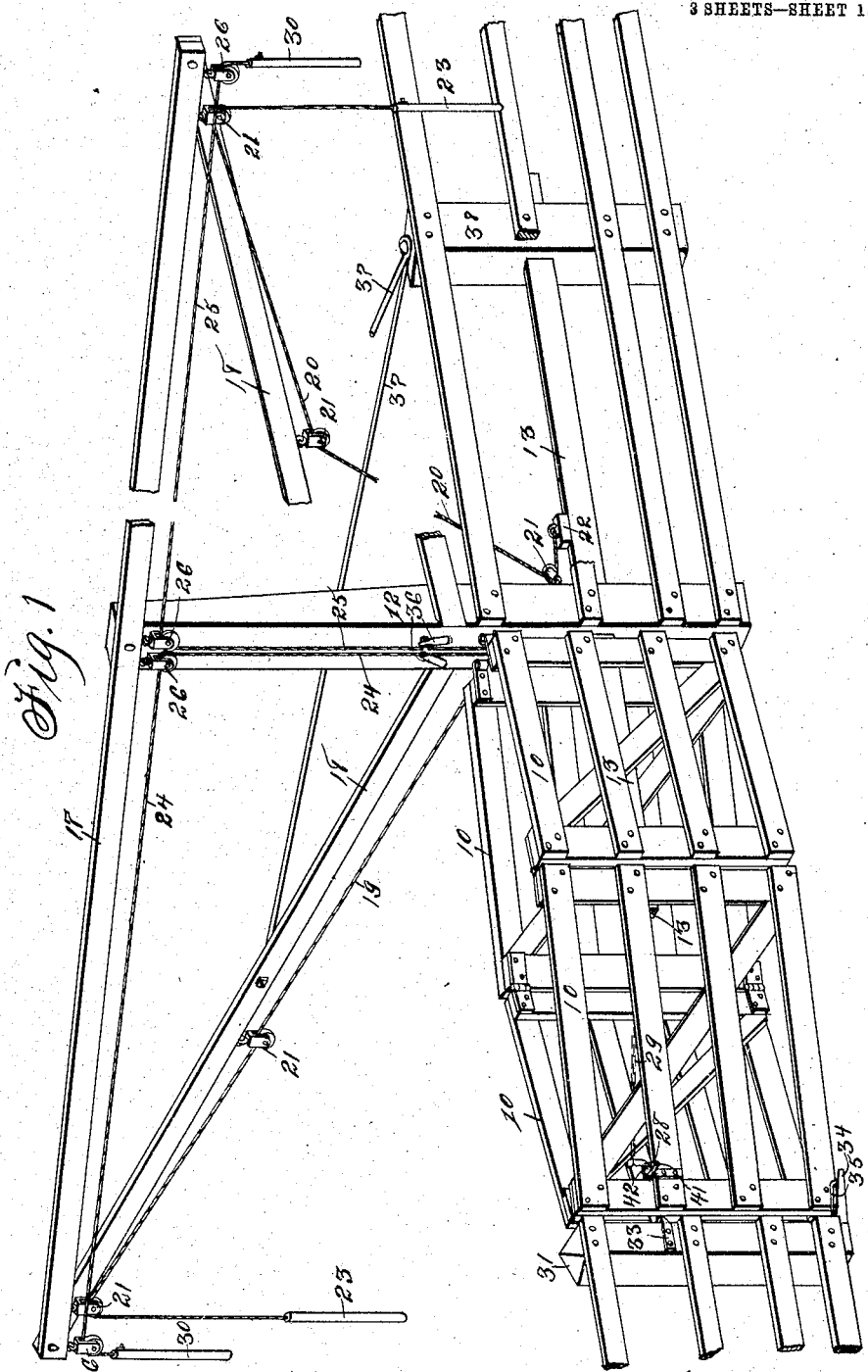

No. 781,109. PATENTED JAN. 31, 1905.
F. Q. STUART.
FOLDABLE FARM GATE.
APPLICATION FILED SEPT. 27, 1904.

3 SHEETS—SHEET 1.

Witnesses: Inventor: Frank Q. Stuart,
By Thomas G. Orwig, Attorney.

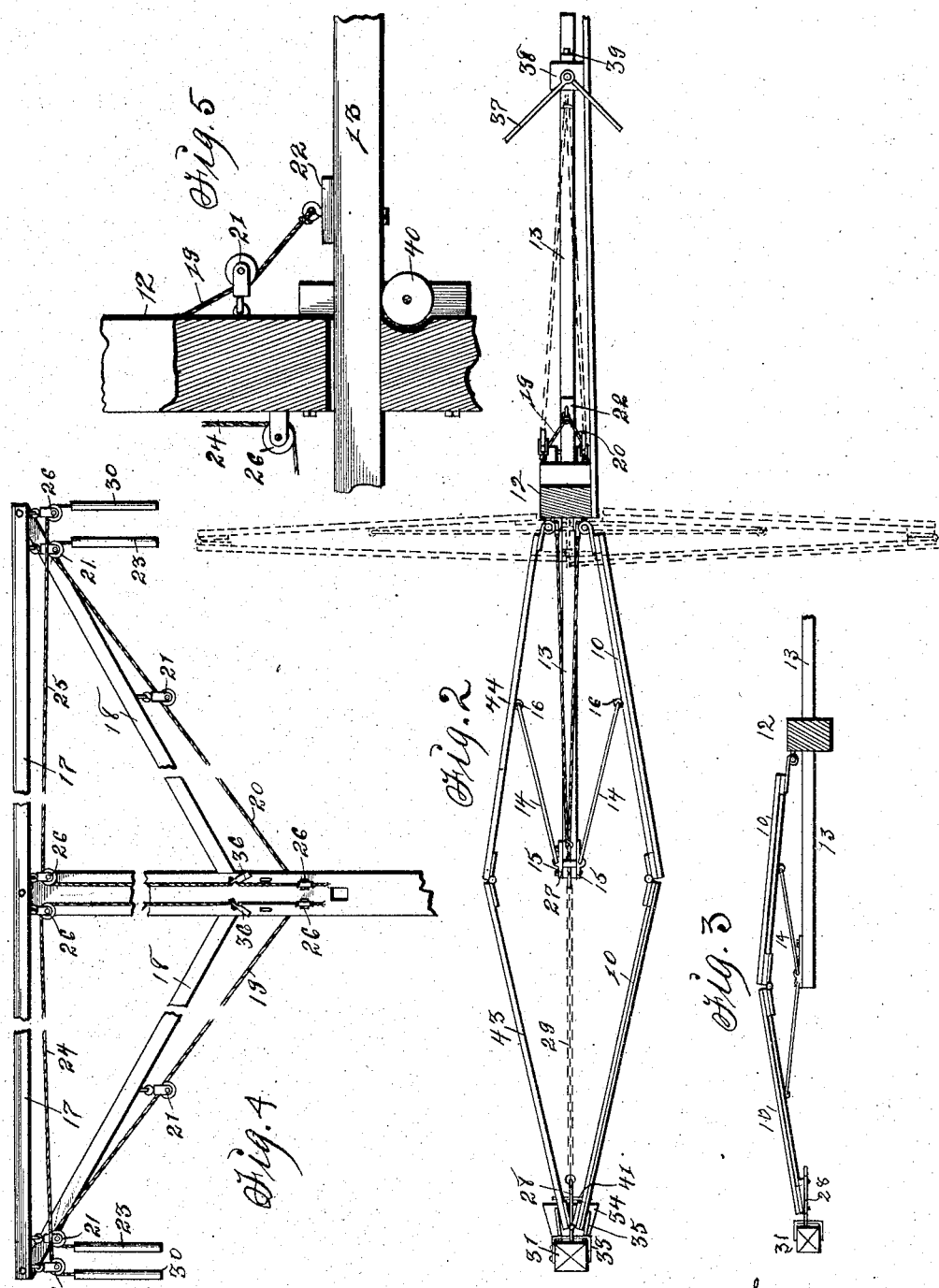

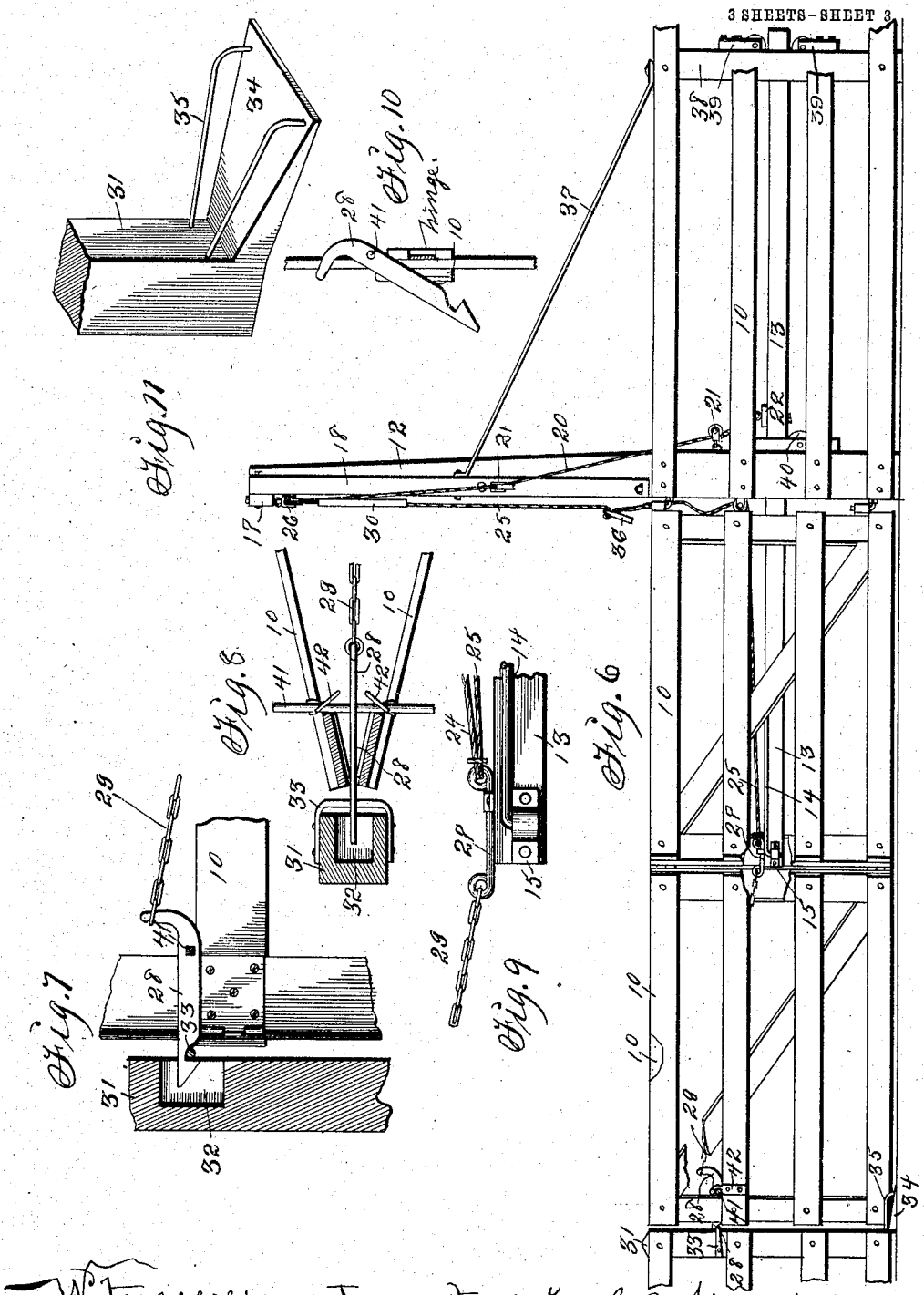

No. 781,109.

Patented January 31, 1905.

UNITED STATES PATENT OFFICE.

FRANK Q. STUART, OF CHARITON, IOWA.

FOLDABLE FARM-GATE.

SPECIFICATION forming part of Letters Patent No. 781,109, dated January 31, 1905.

Application filed September 27, 1904. Serial No. 226,242.

*To all whom it may concern:*

Be it known that I, FRANK Q. STUART, a citizen of the United States, residing at Chariton, in the county of Lucas and State of Iowa, have invented a new and useful Foldable Farm-Gate, of which the following is a specification.

My object is, first, to provide a strong and durable gate specially adapted for use as a farm-gate and also adapted to be advantageously used as a garden-gate or in any place where a passage-way is to be opened and closed at pleasure; second, to provide means to enable a person while advancing toward the gate on horseback or on a vehicle to unlock and open the gate by simply seizing a handle suspended from the end of a rope and retaining hold thereof until the gate is opened and after he has passed through the open gateway to seize another handle on the end of another rope to close the gate as he passes away therefrom; third, to provide a locking-latch that can be operated by a person on horseback or on a vehicle and also lifted by a person on the ground, so he can simply by hand-pressure open and close the gate; fourth, to provide a support for the free end of the gate to prevent the gate from sagging and fenders on the support to prevent any lateral motion of the gate when it is closed as required to resist the pressure of animals or wind on the sides of the gate; fifth, to provide mechanism equally well adapted for operating a gate composed of two or four panels or sections hinged together and to a post and to fold against the post in opening the gateway.

My invention consists in the construction, arrangement, and combination of parts and subcombinations, as hereinafter set forth, pointed out in my claims, and illustrated in the accompanying drawings, in which—

Figure 1 is a perspective view of the gate in position as required for practical use. Fig. 2 is a top view of a gate composed of four sections in a closed and locked position, and dotted lines indicate the position of the gate when open. Fig. 3 is a modification of Fig. 2 and shows two gate-sections hinged together and each section connected with a slidable bar by rods. Fig. 4 shows the upper end portion of the main gate-post and the manner of connecting direction-pulleys and ropes as required to open and close the gate. Fig. 5 shows a section of the main post and a reciprocating or slidable bar extended through a mortise or bearing in the post and also shows the manner of connecting the ends of the ropes with the slidable bar. Fig. 6 shows a gate consisting of four sections in a closed position and the positions of all the operative parts relative to each other and the hinged sections and fixed gate-posts. Fig. 7 is an enlarged sectional view of the post to which the front end of the gate is locked when the gate is in a closed position and shows how the locking-latch is formed and combined with the gate and latch operating mechanism. Fig. 8 is a top view that shows how the front end of the gate is locked to the latch-post. Fig. 9 shows how the latch-operating mechanism is connected with the slidable bar that in its reciprocating movements pulls and pushes the gate alternately in open and closed positions. Fig. 10 shows the gate-latch in a vertical position as occurs by force of gravity when the gate is open. Fig. 11 is a perspective view of the gate-support and fenders at the bottom of the latch-post at the front end of the gate.

The numerals 10 designate four panels or gate-sections hinged together and to the main post 12, as shown in Figs. 1 and 6. It is obvious that the gate-sections may be made of straight pieces of wood in the manner shown or may be of metal frames, with wire rods fixed to the frames. The hinges used to connect the sections with one another and with the main post may also vary as desired and as required to suit wooden or metal gates. A mortise or aperture in the post 12 serves as a bearing for a straight bar 13, that is extended therethrough, as shown in Fig. 5, to be connected with the gate and the ropes for operating the bar and gate as required in opening and closing the gate.

Links 14, provided with hooks at their ends, are pivotally connected with lugs or metal loops 15, fixed to the sides of the front end of the sliding bar 13, as shown in Fig. 2, and screw-eyes 16, projecting inward from the rear gate-sections 10, as shown in Fig. 2.

A cross-head or straight bar 17 is fixed to the top of the post 12 and braces 18 fixed to its ends and to the post, as shown in Fig. 4, or in any suitable way as required to support and direct ropes 19 and 20 upon direction-pulleys 21, connected with said bar and connected with a stop 22, fixed to the central portion of the slidable bar 13, as shown in Figs. 2 and 5, or in any suitable way in such a manner that when a pulling force is applied to pendent handles 23 on the ends of the ropes 19 and 20 the slidable bar 13 will be drawn forward as required to unfold the gate from its open position (indicated by dotted lines in Fig. 2) and extend it forward to be automatically latched or locked to the fixed gate-post 24, as shown in Figs. 2 and 6.

Ropes 24 and 25 are extended over pulleys 26, as shown in Fig. 4, and connected with the ends of a coupling 27, that is slidably mounted on the front end of the slidable bar 13, as shown in Fig. 9, and the front end of the coupling is connected with an elbow-shaped locking-latch 28 by a chain 29, as shown in Figs. 7 and 8, in such a manner that when a pulling force is applied to the pendent handles 30 on the free ends of the ropes 19 and 20 the latch will first be actuated as required to unlock it, and the slidable bar 13 will then be drawn rearward to fold the gate-sections 10 upon each other and into position as indicated by dotted lines in Fig. 2 and as required to open the gateway between the main post 12 and the latch-post 31 at the front of the gate.

The post 31 has a cavity, mortise, or aperture 32 to admit the free end of the latch 28 as required to engage a striker 33, fixed to the post, as shown in Figs. 7 and 8, or in any suitable way as required to lock the gate to the post.

An inclined support 34 is fixed to the bottom of the latch-post 31 to engage the bottom of the front end of the gate to lift it as it is advanced forward to be latched and locked to the post, and fenders 35 are fixed to the support to aid in directing the movements of the gate and prevent it from being pressed laterally by animals or wind. Weights 36 are fixed to the ropes 24 and 25 to counterbalance the wooden handles 30 on their ends as required to keep the ropes stretched over the pulleys and to allow for the shrinking and contracting of the ropes incident to getting wet and to deliver through the sliding coupling and the chain the required slack in the rope to insure the automatic latching or locking of the gate.

Braces 37 are fixed to the braces 18 and a fence-post 38, as shown in Figs. 2 and 6. A bearing for the slidable bar 13 is provided in the form of an aperture in the post 38 and antifriction-rollers 39, connected with the post, as shown in Fig. 6, or in any suitable way as required to support and guide the bar in its reciprocating movements. An anti-friction-roller 40 is also connected with the post 12, as shown in Fig. 4, to aid in supporting the slidable bar and to facilitate its movements back and forth.

The latch 28 is supported by a cross-bar 41, fixed thereto and supported upon the front or end sections of the gate and retained connected with said sections by means of loops 42, fixed to said sections, as shown in Fig. 8, or in any suitable way in such a manner as will allow the cross-bar to slide in the loops as the gate is opened and closed as required to accommodate itself to the varying positions of the gate-sections relative to each other. When the gate is open and folded into position, as indicated by dotted lines in Fig. 2, the latch 28 will by force of gravity assume the position in which it is shown in Fig. 10, where it is on top of a hinge, and when either one of the ropes 24 and 25 is pulled the latch will be drawn into horizontal position as required to engage the striker 33, as shown in Fig. 7, when the gate is closed.

It is obvious that by hinging two bars together and to a gate-post to bend outwardly to the right of the post and hinging two bars together and to the same post to bend outwardly to the right of the same post and hinging the two pairs of bars thus hinged together and to a post together at their free or front ends and connecting operative mechanism therewith two gate-sections may be fixed to one pair of the hinged bars to produce a complete gate, as shown in Fig. 3, or two gate-sections may be fixed to each pair of hinged bars, as shown, to produce a double gate, as shown in Fig. 1.

Having thus set forth the purpose of my invention and the construction and function of each element and subcombination, the arrangement and combination of all the parts and the practical operation and utility of the invention will be readily understood by farmers and others familiar with the art to which it pertains.

What I claim as new, and desire to secure by Letters Patent, is—

1. In a foldable gate, two bars hinged together and one of them hinged to a post to extend horizontally to fold inward toward each other and to project at right angles from the right of the post when folded, two bars hinged together and one of them hinged to a post to extend horizontally to fold inward to each other and to project at right angles from the left of the post and the two pairs of hinged bars hinged together at their front ends, a slidable bar connected with the post, rods pivotally connected with the slidable bar and with the rear parts of the bars that are hinged together to fold in opposite directions and means for moving the slidable bar backward and forward, arranged and combined to operate in the manner set forth, for the purposes stated.

2. In a foldable gate, four mating gate-sections hinged together, except the rear ends of the rear sections which are hinged to a post, a slidable bar in a bearing connected with the post, rods flexibly connected with the bar and with the rear sections of the gate and means to operate the slidable bar, arranged and combined for the purposes stated.

3. In a foldable gate, a fixed post provided with a bearing for a slidable bar, four gate-sections hinged together and the rear ends of two of said sections hinged to the post, a slidable bar, rods pivotally connected with the front end of the slidable bar and with the rear gate-sections, a coupling slidably connected with the front end of the slidable bar, a latch pivotally connected with the free end of the gate, a chain connected with the latch and the slidable coupling and two ropes connected with the rear end of the coupling, to operate in the manner set forth for the purposes stated.

4. In a foldable gate, a fixed post provided with a bearing for a slidable bar, four gate-sections hinged together and the rear ends of two of said sections hinged to the post, a slidable bar, rods pivotally connected with the front end of the slidable bar and with the rear gate-sections, a coupling slidably connected with the front end of the slidable bar, a latch pivotally connected with the free end of the gate, a chain connected with the latch and the slidable coupling and two ropes connected with the rear end of the coupling, and direction-pulleys connected with the post to support the ropes, arranged and combined to operate in the manner set forth for the purposes stated.

5. In a foldable gate, a fixed post provided with a bearing for a slidable bar, four gate-sections hinged together and the rear ends of two of said sections hinged to the post, a slidable bar, rods pivotally connected with the front end of the slidable bar and with the rear gate-sections, a coupling slidably connected with the front end of the slidable bar, a latch pivotally connected with the free end of the gate, a chain connected with the latch and the slidable coupling and two ropes connected with the rear end of the coupling, two ropes connected with the central portion of the slidable bar and direction-pulleys connected with the post to support the ropes, arranged and combined to operate in the manner set forth for the purposes stated.

6. In a foldable gate, a fixed post provided with a bearing for a slidable bar, four gate-sections hinged together and the rear ends of two of said sections hinged to the post, a slidable bar, rods pivotally connected with the front end of the slidable bar and with the rear gate-sections, a coupling slidably connected with the front end of the slidable bar, a latch pivotally connected with the free end of the gate, a chain connected with the latch and the slidable coupling, a fixed post having a cavity mortise or aperture and a fixed striker across the cavity to engage the latch and two ropes connected with the rear end of the coupling, to operate in the manner set forth.

7. In a foldable gate, a fixed post provided with a bearing for a slidable bar, four gate-sections hinged together and the rear ends of two of said sections hinged to the post, a slidable bar, rods pivotally connected with the front end of the slidable bar and with the rear gate-sections, a coupling slidably connected with the front end of the slidable bar, a latch pivotally connected with the free end of the gate, a chain connected with the latch and the slidable coupling and two ropes connected with the rear end of the coupling, two ropes connected with the central portion of the slidable bar and direction-pulleys connected with the post to support the ropes, and a post in rear of the main post provided with a bearing for the slidable bar, arranged and combined to operate in the manner set forth for the purposes stated.

8. In a foldable gate, a fixed post provided with a bearing for a slidable bar, four gate-sections hinged together and the rear ends of two of said sections hinged to the post, a slidable bar, rods pivotally connected with the front end of the slidable bar and with the rear gate-sections, a coupling slidably connected with the front end of the slidable bar, a latch pivotally connected with the free end of the gate, a chain connected with the latch and the slidable coupling, two ropes connected with the rear end of the coupling and weights connected with the two ropes above the slidable bar, to operate in the manner set forth for the purposes stated.

9. In a foldable gate, a fixed post provided with a bearing for a slidable bar, four gate-sections hinged together and the rear ends of two of said sections hinged to the post, a slidable bar, rods pivotally connected with the front end of the slidable bar and with the rear gate-sections, a coupling slidably connected with the front end of the slidable bar, a latch pivotally connected with the free end of the gate, a chain connected with the latch and the slidable coupling, two ropes connected with the rear end of the coupling, two ropes connected with the central portion of the slidable bar, direction-pulleys connected with the post to support the ropes, and handles pendent from the free ends of the ropes, arranged and combined to operate in the manner set forth for the purposes stated.

10. In a foldable gate, a fixed post provided with a bearing for a slidable bar, four gate-sections hinged together and the rear ends of two of said sections hinged to the post, a slidable bar, rods pivotally connected with the front end of the slidable bar and with the rear gate-sections, a coupling slidably connected with the front end of the slidable bar, a latch pivotally connected with the free end of the gate, a chain connected with the latch and the slidable coupling, a post provided with a cavity or aperture and a striker fixed across the cavity to engage the latch, an inclined gate-support at the lower end of the post, two ropes connected with the rear end of the coupling, two ropes connected with the central portion of the slidable bar, direction-pulleys connected with the post to support the ropes and handles pendent from the free ends of the ropes, arranged and combined to operate in the manner set forth for the purposes stated.

11. In a foldable gate, a fixed post provided with a bearing for a slidable bar, four gate-sections hinged together and the rear ends of two of said sections hinged to the post, a slidable bar, rods pivotally connected with the front end of the slidable bar and with the rear gate-sections, a coupling slidably connected with the front end of the slidable bar, a latch pivotally connected with the free end of the gate, a chain connected with the latch and the slidable coupling, a post provided with a cavity or aperture and a striker fixed across the cavity to engage the latch, an inclined gate-support at the lower end of the post, two ropes connected with the rear end of the coupling, two ropes connected with the central portion of the slidable bar, direction-pulleys connected with the post to support the ropes, handles pendent from the free ends of the ropes, and fenders fixed to the sides of the inclined support, arranged and combined to operate in the manner set forth for the purposes stated.

12. In a foldable gate, a fixed post provided with a bearing for a slidable bar, four gate-sections hinged together and the rear ends of two of said sections hinged to the post, a slidable bar, rods pivotally connected with the front end of the slidable bar and with the rear gate-sections, a coupling slidably connected with the front end of the slidable bar, a latch pivotally connected with the free end of the gate, a cross-bar fixed to the latch, means for adjustably connecting the ends of the cross-bar with the front ends of the front sections of the gate, a chain connected with the latch and the slidable coupling, and two ropes connected with the rear end of the coupling, to operate in the manner set forth for the purposes stated.

13. In a foldable gate, gate-sections hinged to a post provided with a bearing for a slidable bar, a slidable bar, rods pivotally connected with the slidable bar and the two rear gate-sections hinged to the post, a latch pivotally connected with the two front sections of the gate, a rope slidably connected with the front end of the slidable bar and also connected with the latch, and means for operating the rope to slide the bar and to operate the latch, as set forth for the purposes stated.

FRANK Q. STUART.

Witnesses:
C. W. STUART,
W. P. BEEM.